United States Patent
Lappi et al.

(10) Patent No.: US 10,761,937 B2
(45) Date of Patent: Sep. 1, 2020

(54) IN-FIELD ADAPTIVE DRIVE RECOVERY

(71) Applicant: Western Digital Technologies, Inc., San Jose, CA (US)

(72) Inventors: Cory Lappi, Rochester, MN (US); William Jared Walker, Rochester, MN (US); Xin Chen, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 178 days.

(21) Appl. No.: 16/136,152

(22) Filed: Sep. 19, 2018

(65) Prior Publication Data
US 2019/0087274 A1     Mar. 21, 2019

Related U.S. Application Data

(60) Provisional application No. 62/561,619, filed on Sep. 21, 2017.

(51) Int. Cl.
*G06F 11/00* (2006.01)
*G06F 11/14* (2006.01)
(Continued)

(52) U.S. Cl.
CPC .......... *G06F 11/142* (2013.01); *G06F 3/0652* (2013.01); *G06F 11/073* (2013.01);
(Continued)

(58) Field of Classification Search
CPC .. G06F 11/142; G06F 11/0727; G06F 11/073; G06F 11/0778; G06F 11/0793; G06F 11/1417; G06F 11/0703; G06F 11/1402; G06F 11/1405; G06F 11/1415; G06F 11/1428; G06F 11/1435; G06F 11/1438; G06F 11/1441; G06F 11/16; G06F 11/1612; G06F 11/1666; G06F 11/3034; G06F 11/3037; G06F 3/0652;
(Continued)

(56) References Cited

U.S. PATENT DOCUMENTS 9,122,587 B2 * 9/2015 Baryudin ............ G06F 12/0246
10,372,558 B2 * 8/2019 Park .................... G06F 11/1469
(Continued)

*Primary Examiner* — Anthony J Amoroso
(74) *Attorney, Agent, or Firm* — Patterson & Sheridan, LLP; Steven H. Versteeg

(57) ABSTRACT

The present disclosure generally relates to recovering storage devices in-field without the need to return the storage device to the factory. The storage device tracks detailed failure information. After receiving a signal or sequence of commands from a host device to prepare the storage device for a recovery download, the storage device determines whether to enter an adaptive field recovery state or a host-selected recovery state. If the storage device enters the adaptive field recovery state, the storage device determines which error state the device is in based on the detailed failure information, and selects an appropriate recovery level. After selecting the appropriate recovery level while in the adaptive field recovery state or after entering the host-selected recovery state, the storage device receives and downloads a recovery download package. The recovery download package comprises one or more recovery actions necessary to repair the error state.

30 Claims, 2 Drawing Sheets

(51) Int. Cl.
   *G06F 12/02* (2006.01)
   *G06F 11/07* (2006.01)
   *G06F 3/06* (2006.01)

(52) U.S. Cl.
   CPC ...... *G06F 11/0727* (2013.01); *G06F 11/0778* (2013.01); *G06F 11/0793* (2013.01); *G06F 11/1417* (2013.01); *G06F 12/0246* (2013.01); *G06F 2212/214* (2013.01); *G06F 2212/7205* (2013.01); *G06F 2212/7206* (2013.01)

(58) Field of Classification Search
   CPC ............... G06F 3/0655; G06F 12/0246; G06F 12/0238; G06F 2212/214; G06F 2212/7205; G06F 2212/7206; G11B 20/18; G11B 20/1883
   See application file for complete search history.

(56) References Cited

U.S. PATENT DOCUMENTS

| | | | |
|---|---|---|---|
| 10,540,232 B2* | 1/2020 | Brown | G06F 11/076 |
| 2016/0232057 A1* | 8/2016 | Star | G06F 9/4408 |

\* cited by examiner

IN-FIELD ADAPTIVE DRIVE RECOVERY

CROSS-REFERENCE TO RELATED APPLICATIONS

This application claims benefit of U.S. Provisional Patent Application Ser. No. 62/561,619, filed Sep. 21, 2017, which is herein incorporated by reference.

BACKGROUND OF THE DISCLOSURE

Field of the Disclosure

Embodiments of the present disclosure generally relate to a storage device, such as a solid state drive (SSD), and a method of operating the storage device.

Description of the Related Art

From time to time, storage devices such as SSDs become bugged, leaving the storage device in a bad or corrupt state or causing the device to fail. In worst case scenarios, the storage device "bricks" (i.e., no data is available). Once the device "bricks", the device must typically be returned to the factory or manufacturer to be recovered and debugged.

Returning a device to the factory is time consuming, inconvenient, and frustrating for both the device owner and manufacturer. The device owner does not have possession of the storage device while the device is serviced at the factory, and as such, is unable to use the device. Additionally, the factory has to expend resources to recover a "bricked" device, such as time, money, and man-power. The expended resources could be used on other projects.

Therefore, there is a need in the art to recover "bricked" devices with minimal downtime to device owners and the factory.

SUMMARY OF THE DISCLOSURE

The present disclosure generally relates to recovering storage devices in-field without the need to return the storage device to the factory. The storage device tracks detailed failure information. After receiving a signal or sequence of commands from a host device to prepare the storage device for a recovery download, the storage device determines whether to enter an adaptive field recovery state or a host-selected recovery state. If the storage device enters the adaptive field recovery state, the storage device determines which error state the device is in based on the detailed failure information, and selects an appropriate recovery level. After selecting the appropriate recovery level while in the adaptive field recovery state or after entering the host-selected recovery state, the storage device receives and downloads a recovery download package. The recovery download package comprises one or more recovery actions necessary to repair the error state.

In one embodiment, a method for recovering an in-field storage device comprises tracking failure information, receiving one or more commands, and downloading a recovery download package comprising one or more recovery actions.

In another embodiment, a method for recovering an in-field storage device comprises receiving a preparation signal to prepare the storage device for recovery, entering an adaptive field recovery state, and receiving a download package while in the adaptive field recovery state to recover the storage device.

In one embodiment, a storage device comprises one or more memory devices, one or more processors coupled to the one or more memory devices; and a controller coupled to the one or more memory devices and the one or more processors. The controller is configured to receive a trigger to enter an adaptive field recovery state, confirm the storage device is in a state of error, determine which error state the storage device is in while in the adaptive field recovery state, and repair the error state of the storage device.

In another embodiment, a storage device comprises one or more memory devices and a controller coupled to the one or more memory devices. The controller is configured to track error information as the storage device enters an error state, receive a preparation signal, receive a re-zeroing command to initiate the storage device to enter an adaptive field recovery state, select an appropriate recovery level based on the tracked error information while in the adaptive field recovery state, and download recovery firmware and metadata corresponding to the selected appropriate recovery level.

In yet another embodiment, a storage device comprises means for tracking failure information, means for receiving a trigger to cause the storage device to enter an adaptive field recovery state, means for confirming the storage device is in a failure state, means for selecting one or more recovery actions while in the adaptive field recovery state based on the tracked failure information, and means for implementing the one or more recovery actions to recover the storage device from the failure state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to recovering storage devices in-field without the need to return the storage device to the factory. The storage device tracks detailed failure information. After receiving a signal or sequence of commands from a host device to prepare the storage device for a recovery download, the storage device determines whether to enter an adaptive field recovery state or a host-selected recovery state. If the storage device enters the adaptive field recovery state, the storage device determines which error state the device is in based on the detailed failure information, and selects an appropriate recovery level. After selecting the appropriate recovery level while in the adaptive field recovery state or after entering the host-selected recovery state, the storage device receives and downloads a recovery download package. The recovery download package comprises one or more recovery actions necessary to repair the error state.

Figure 1:
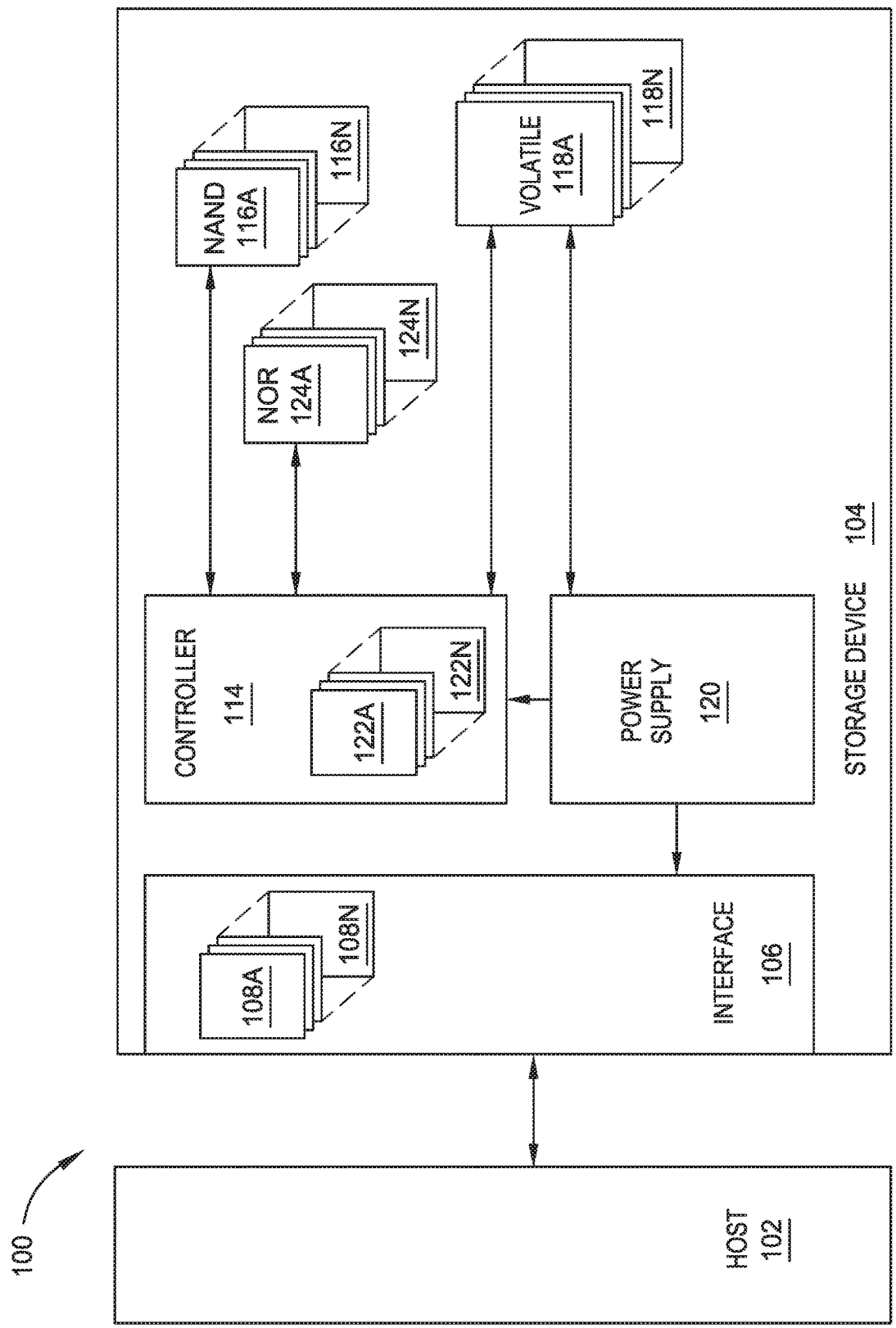
FIG. 1 is a schematic illustration of data storage system according to one embodiment.

FIG. 1 is a schematic illustration of data storage system 100 according to one embodiment. The data storage system 100 includes a host device 102 and a storage device 104. The host device 102 is coupled to the storage device 104 both physically as well as electronically through an interface 106 that contains one or more phys 108A-108N.

The storage device 104 includes a controller 114 that is coupled to and communicates with the interface 106. A power supply 120 is coupled to the interface 106 and the controller 114. The controller 114 includes one or more processors 122A-122N. The controller 114 is coupled to one or more fast or quick non-volatile memory devices 116A-116N, one or more volatile memory devices 118A-118N, and one or more slow non-volatile memory devices 124A-124N. An example of a slow non-volatile memory device 124A-124N is a NOR memory device and an example of a fast or quick non-volatile memory device 116A-116N is a NAND memory device. It is to be understood that NOR memory devices are but one example of the slow non-volatile memory devices 124A-124N and thus, the slow non-volatile memory devices 124A-124N are not to be limited to NOR memory devices. Additionally, it is to be understood that NAND memory devices are but one example of the fast non-volatile memory devices 116A-1164N and thus, the fast non-volatile memory devices 116A-116N are not to be limited to NAND memory devices.

In some examples, the storage device 104 may include additional components not shown in FIG. 1 for sake of clarity. For example, the storage device 104 may include a printed board (PB) to which components of the storage device 104 are mechanically attached and which includes electrically conductive traces that electrically interconnect components of storage device 104, or the like. In some examples, the physical dimensions and connector configurations of the storage device 104 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, storage device 104 may be directly coupled (e.g., directly soldered) to a motherboard of the host device 102.

The interface 106 may operate in accordance with any suitable protocol. For example, the interface 106 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 106 (e.g., the data bus, the control bus, or both) is electrically connected to the controller 114, providing electrical connection between the host device 102 and the controller 114, allowing data to be exchanged between host device the 102 and the controller 114. In some examples, the electrical connection of the interface 106 may also permit the storage device 104 to receive power from the host device 102. For example, as illustrated in FIG. 1, the power supply 120 may receive power from host device the 102 via the interface 106.

The storage device 104 includes the power supply 120, which may provide power to one or more components of the storage device 104 and is optional. When operating in a standard mode, the power supply 120 may provide power to the one or more components using power provided by an external device, such as the host device 102. For instance, the power supply 120 may provide power to the one or more components using power received from the host device 102 via the interface 106. In some examples, the power supply 120 may include one or more power storage components configured to provide power to the one or more components when operating in a shutdown mode, such as where power ceases to be received from the external device. In this way, the power supply 120 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 104 includes one or more volatile memory devices 118A-118N, which may be used by the controller 114 to temporarily store information. In some examples, the controller 114 may use the one or more volatile memory devices 118A-118N as a cache. For instance, the controller 114 may store cached information in the one or more volatile memory devices 118A-118N until the cached information is written to the one or more non-volatile memory devices 116A-116N or 124A-124N. The one or more volatile memory devices 118A-118N may consume power received from the power supply 120 to maintain the data stored in the one or more volatile memory devices 118A-118N. Examples of volatile memory include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)). In at least one implementation, the one or more volatile memory devices 118A-118N comprise at least one DRAM device.

The storage device 104 includes the controller 114, which may manage one or more operations of the storage device 104. For instance, the controller 114 may manage the reading of data from and/or the writing of data to the one or more non-volatile memory devices 116A-116N, 124A-124N and the one or more volatile memory devices 118A-118N. In some examples, the controller 114 may manage the reading of data from and/or the writing of data to the one or more non-volatile memory devices 116A-116N or one or more volatile memory devices 118A-118N by exchanging signals with the one or more non-volatile memory devices 116A-116N or the one or more volatile memory devices 118A-118N. As discussed above, the controller 114 may exchange signals with the one or more non-volatile memory devices 116A-116N or the one or more volatile memory devices 118A-118N in accordance with a communication protocol.

The controller 114 includes one or more processors 122A-122N. The processors 122A-122N may be configured to execute tasks. The tasks may be of different types, and, in some examples, each respective type of task may be stored in or associated with a respective task queue while waiting for execution by the processor 122A-122N. The different types of tasks may include, for example, front end tasks, which may include receiving and interpreting instructions received from the host device 102. Other types of tasks including caching; back-end tasks, which may include reading data from or writing data to non-volatile memory 116; housing-keeping, which may include garbage collection, wear leveling, TRIM, or the like; and system tasks. In some examples, the processor 122A-122N may be referred to as a computer unit, a processing unit, a core, or a central processing unit (CPU).

As will be discussed in greater detail below, firmware can be used to perform a low level format, install certain reserved area files, erase certain parts of the reserved area, and rewriting certain parts of the reserved area to recover a storage device in-field. The firmware can perform the recovery if a certain sequence of commands is issued prior to downloading a download package. Once the download takes place, the recovery occurs.

The storage device firmware tracks detailed failure information, allowing the recovery firmware to determine what kind of recovery actions are necessary to recover the storage device. The specific recovery steps taken are based on the drive state at the time of the download. For example, a re-zero prior to the download may be used to trigger adaptive field recovery by the end user of the storage device. The host device 102 then sends the re-zeroing command to the storage device. As a safety valve, a time limit, for example 60 seconds, between the re-zeroing and the download may be used for the download to trigger the adaptive recovery. Once the pre-specified time limit has expired, any download would be treated normally.

The trigger mechanism would come from the host device to perform the automated storage device recovery. The device recovery would occur on the subsequent download that takes the firmware in and checks the state of the drive that could normally not perform a download and looks at the drive state to determine if the slow update of the firmware storage area (i.e., NOR) or a low level reformat or something else is necessary to reset the device. Once the device is reset, the device should be usable again although the data stored on the device prior to the reset may be lost. In the most basic sense, the firmware on the storage device checks for failure information and then performs a recovery using the firmware.

The advantages of the disclosure are that storage device failures can be solved by the end user rather than returning the storage device to the factory. Doing so reduces downtime and expense for the end user as well as the factory or manufacturer. By using the firmware on the storage device, failure data can be analyzed, the storage device can be re-zeroed, and the device can be recovered without the need to send the device back to the factory.

Figure 2:
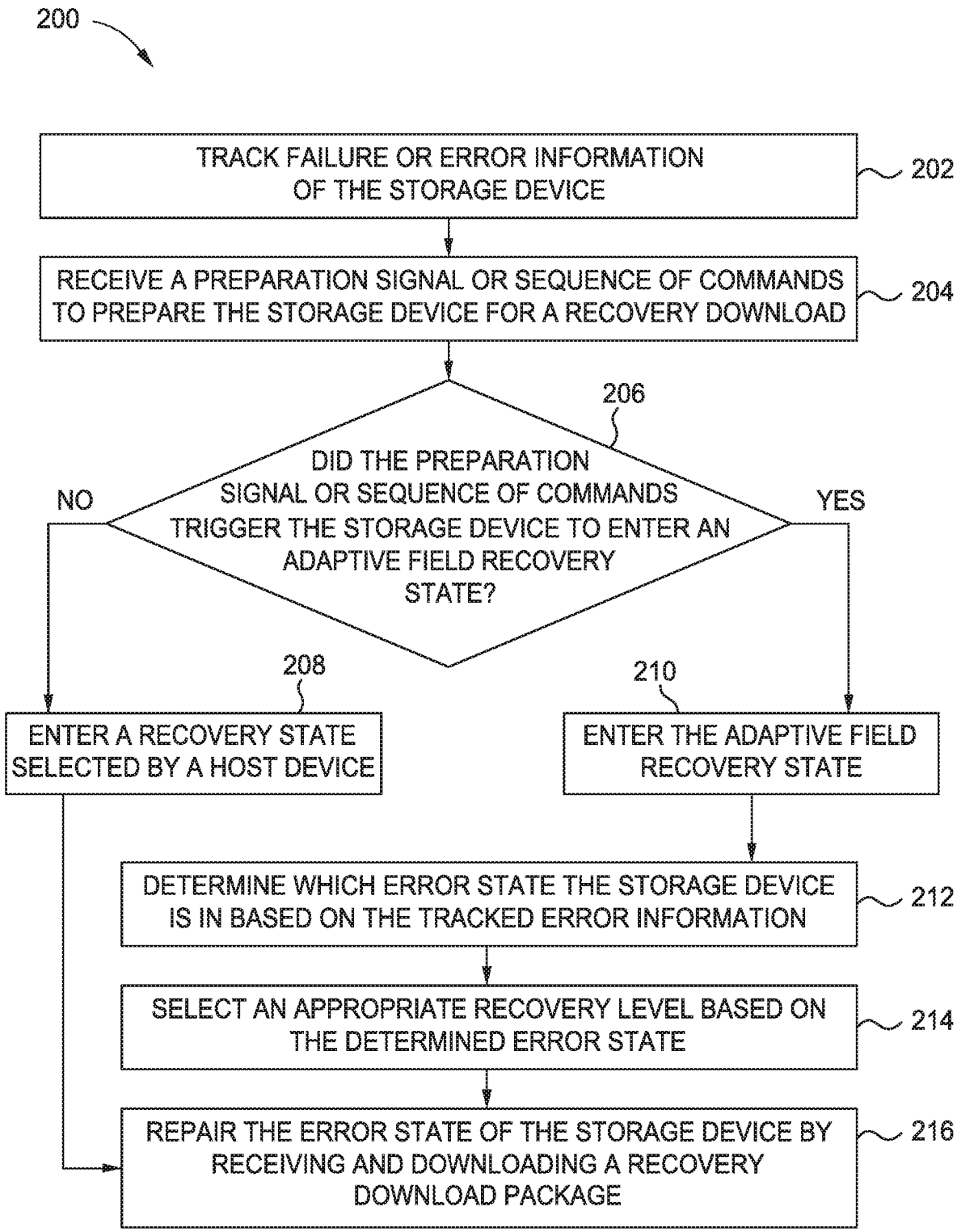
FIG. 2 illustrates a method of performing an in-field recovery of a storage device, according to one embodiment.

FIG. 2 illustrates a method 200 of performing an in-field recovery of a storage device, according to one embodiment. Method 200 may be used with the system 100 of FIG. 1 comprising a host device 102 and a storage device 104.

In operation 202, storage device firmware tracks detailed failure or error information as the device experiences errors or failure. The device firmware may track the events that occurred during the failure or corruption, such as debug data. The storage device may become bugged by one or more bugs that cause the device to undergo errors or failure. Each bug affecting the storage device may cause different issues, and some bugs may result in more severe errors or damage than other bugs. By tracking the error information, the firmware can determine the events caused by the bug(s) leading up to and during the errors or failure.

In operation 204, a preparation signal or certain sequence of commands is received by the storage device to prepare the device for a recovery download. A host device, such as host device 102 of FIG. 1, may send the signal or sequence of commands to the storage device. An end user of the storage device may send the signal or sequence of commands from the host device to the storage device. The preparation signal or sequence of commands may comprise one or more commands. The preparation signal or sequence of commands may further comprise a value indicating a recovery level or state. The signal or sequence of commands alerts the storage device that the next download will be a recovery download and prepares the device to receive a recovery download package. The preparation signal or sequence of commands may include recovery firmware.

In operation 206, the storage device determines whether the preparation signal or sequence of commands received in operation 204 triggered the storage device to enter an adaptive field recovery state. If the preparation signal or sequence of commands received in operation 204 does trigger the storage device to enter the adaptive field recovery state, method 200 proceeds to operation 210. If the preparation signal or sequence of commands received in operation 204 does not trigger the storage device to enter the adaptive field recovery state, method 200 proceeds to operation 208.

In operation 208, the storage device enters a recovery state or mode selected by the host device. The preparation signal or sequence of commands received in operation 204 may comprise a command to enter a certain recovery mode or state. The preparation signal or sequence of commands received in operation 204 may further comprise a value indicating the recovery level or type of recovery the storage device should perform. The storage device may receive the preparation signal or sequence of commands dictating a host-selected recovery level or mode and enters the recovery state. The host device may determine which error state the storage device is in based on the tracked error information, and include a command in the preparation signal or sequence of commands received in operation 204 instructing the storage device to enter a recovery state based on the tracked error information. Once the storage device enter the host-selected recovery state, method 200 proceeds to operation 216 as discussed below.

In operation 210, the "bricked" or corrupted storage device enters the adaptive field recovery state. The storage device entering the adaptive field recovery state permits the storage device to determine what type of recovery to perform in order repair the storage device. In one embodiment, the signal or sequence of commands received in operation 204 triggers or instructs the storage device to enter an adaptive field recovery state. For example, the host device may send one or more commands to the storage device in operation 204 to instruct the storage device to enter the adaptive field recovery state. In another embodiment, the storage device is re-zeroed to trigger the adaptive field recovery state. The re-zero command may be sent from the host device to the storage device by an end user of the storage device.

The re-zero command may be utilized as a safety valve to limit the possibility of performing an accidental drive recovery. For example, a timer timing a pre-specified time limit may start when the storage device receives the re-zero command and enters the adaptive field recovery state. If the timer expires without the storage device receiving a download package, the storage drive will exit the adaptive field recovery state. The pre-specified time limit may be about 60 seconds. Thus, if a properly functioning device is accidently or unintentionally re-zeroed, the timer will expire without receiving a download and the device will exit the adaptive field recovery state. If a download package is received during the pre-specified time before the timer expires, the device is confirmed as being "bricked" or corrupt, and the next download by the device will cause the device to perform an adaptive field recovery.

In operation 212, device firmware determines which error state the storage device is in based on the tracked error information. The storage device may be in one of a variety of error states, some more destructive than others. The device firmware may determine the severity of the errors or corruption of the device based on the tracked error information.

In operation 214, device firmware selects an appropriate recovery level based on the determined error state. The device firmware determines which recovery level is necessary to recover or debug the storage device. The device firmware may determine a value indicating the level of recovery to perform.

Depending on the error state, some storage devices may require a full recovery while others only require a partial recovery. In a full recovery, the storage device may require a complete reset to factory settings, which may cause a complete loss of data. Other error states may be less harsh, and a partial recovery level comprising less destructive recovery actions may be selected such that some data may be saved. For example, in a partial recovery, the erase cycle counts of the device may be maintained and wear levelling of one or more memory devices in the storage device may be retained. Additionally, if the one or more memory devices comprise a NAND memory device, such as NAND memory device 116A of FIG. 1, NAND management of the NAND device may remain functioning in the partial recovery. The host device may select the appropriate recovery level based on the determined error state.

Following both operation 208 and operation 214, method 200 proceeds to operation 216. In operation 216, the error state of the storage device is repaired or debugged by receiving and downloading a recovery download package. In at least one implementation, the recovery download package is a standard download package. The recovery download package may be a complete download package regardless of the level of recovery determined in operation 214 or selected in operation 208. In another embodiment, the recovery download package corresponds to the selected appropriate recovery level of operation 214 or selected in operation 208. The recovery download package may perform the level of recovery indicated by the value determined in operation 214 or received in operation 204. The recovery download package is received from the host device. In one embodiment, the storage device signals the host device to send the appropriate recovery download package following operation 214. In another embodiment, the host device sends the download recovery package to the storage device after the storage device enters the host-selected recovery state in operation 208.

The recovery download package contains recovery firmware and/or metadata. The recovery firmware and/or metadata comprise one or more recovery actions needed to recover or repair the device. Thus, depending on the recovery level selected in operation 208 or 214, the recovery download package may include both recovery firmware and metadata, or only one or the other. The storage device may download only the firmware and/or metadata required to recovery the device. For example, the storage device may download firmware and/or metadata from the download package corresponding to the value or recovery level determined in operation 204 or 214. One or more recovery actions may be included in the recovery download package. Examples of such recovery actions may include manufacturing drive set up steps, installing reserved area files, erasing select portions of a reserved area, rewriting select portions of a reserved area, performing a low level format, recovering data, and creating a metadata file. It is to be understood that other recovery actions may be included in the recovery download package, and the recovery actions are not limited to those listed.

By downloading the recovery actions necessary to recover the device from a recovery download package, storage devices may be recovered in-field in a secure manner. Downloading the recovery download package allows the storage device to recover itself internally by performing all recovery actions inside the firmware. Thus, storage device failures can be solved by the end user rather than returning the storage device to the factory for debugging. Doing so reduces downtime and expenses for the end user as well as for the manufacturer.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory storage medium. The term "non-transitory" may indicate that the storage medium is not embodied in a carrier wave or a propagated signal. In certain examples, a non-transitory storage medium may store data that can, over time, change (e.g., in RAM or cache).

In one embodiment, a method for recovering an in-field storage device comprises tracking failure information, receiving one or more commands, downloading a recovery download package comprising one or more recovery actions.

The one or more recovery actions may comprise installing reserved area files. The one or more recovery actions may comprise erasing select portions of a reserved area. The one or more recovery actions may comprise rewriting select portions of a reserved area. The one or more recovery actions may comprise performing a low level format. The method may further comprise determining one or more recovery actions needed to recover the storage device based on the tracked failure information prior to downloading the recovery download package. The one or more commands received may comprise a command instructing the storage device to enter a selected recovery state.

In another embodiment, a method for recovering an in-field storage device comprises receiving a preparation signal to prepare the storage device for recovery, entering an adaptive field recovery state, and receiving a download package while in the adaptive field recovery state to recover the storage device.

The method may further comprise determining what level of recovery is needed to recover the storage device while in the adaptive field recovery state prior to receiving the download package. The storage device may be triggered to enter the adaptive field recovery state by receiving a re-zeroing command. A timer timing a pre-specified time limit starts when the first storage device enters the adaptive field recovery state. The download package may be received by the first storage device before the timer expires. The storage device may be triggered to enter the adaptive field recovery state by receiving a sequence of commands.

In one embodiment, a storage device comprises one or more memory devices, one or more processors coupled to the one or more memory devices; and a controller coupled to the one or more memory devices and the one or more processors. The controller is configured to receive a trigger to enter an adaptive field recovery state, confirm the storage device is in a state of error, determine which error state the storage device is in while in the adaptive field recovery state, and repair the error state of the storage device.

Repairing the error state may comprise recovering data. Repairing the error state may comprise creating a metadata file. Repairing the error state may comprise downloading a download package. The download package may comprise firmware and metadata. Confirming the storage device is in a state of error may comprise receiving a download package before a pre-determined time limit expires.

In another embodiment, a storage device comprises one or more memory devices and a controller coupled to the one or more memory devices. The controller is configured to track error information as the storage device enters an error state, receive a preparation signal, receive a re-zeroing command to initiate the storage device to enter an adaptive field recovery state, select an appropriate recovery level based on the tracked error information while in the adaptive field recovery state, and download recovery firmware and metadata corresponding to the selected appropriate recovery level.

The appropriate recovery level may be a partial recovery. The partial recovery may maintain erase cycle counts. The partial recovery may maintain a wear level of the one or more memory devices. The one or more memory devices may comprise a NAND memory device. NAND management of the NAND device may remain functioning in the partial recovery. The appropriate recovery level may be a full recovery. The full recovery may reset the storage device to factory settings. The recovery firmware and metadata may be comprised in a standard download package.

In yet another embodiment, a storage device comprises means for tracking failure information, means for receiving a trigger to cause the storage device to enter an adaptive field recovery state, means for confirming the storage device is in a failure state, means for selecting one or more recovery actions while in the adaptive field recovery state based on the tracked failure information, and means for implementing the one or more recovery actions to recover the storage device from the failure state.

The trigger may be a re-zeroing command. The means for implementing the one or more recovery actions to recover the storage device from the failure state may comprise downloading a recovery download package.

While the foregoing is directed to embodiments of the present disclosure, other and further embodiments of the disclosure may be devised without departing from the basic scope thereof, and the scope thereof is determined by the claims that follow.

What is claimed is:

1. A method for recovering an in-field storage device, comprising:
    tracking failure information;
    receiving one or more commands;
    receiving a recovery download package before a pre-determined time limit expires to confirm the storage device is in a state of error; and
    downloading the recovery download package comprising one or more recovery actions.

2. The method of claim 1, wherein the one or more recovery actions comprise installing reserved area files.

3. The method of claim 1, wherein the one or more recovery actions comprise erasing select portions of a reserved area.

4. The method of claim 1, wherein the one or more recovery actions comprise rewriting select portions of a reserved area.

5. The method of claim 1, wherein the one or more recovery actions comprise performing a low level format.

6. The method of claim 1, further comprising determining one or more recovery actions needed to recover the storage device based on the tracked failure information prior to downloading the recovery download package.

7. The method of claim 1, wherein the one or more commands received comprise a command instructing the storage device to enter a selected recovery state.

8. A method for recovering an in-field storage device, comprising:
receiving a preparation signal to prepare the storage device for recovery;
entering an adaptive field recovery state, wherein the storage device is triggered to enter the adaptive field recovery state by receiving a re-zeroing command; and
receiving a download package while in the adaptive field recovery state to recover the storage device.

9. The method of claim 8, further comprising determining what level of recovery is needed to recover the storage device while in the adaptive field recovery state prior to receiving the download package.

10. The method of claim 8, wherein a timer timing a pre-specified time limit starts when the storage device enters the adaptive field recovery state, and wherein the download package is received by the storage device before the timer expires.

11. The method of claim 8, further comprising selecting an appropriate recovery level while in the adaptive field recovery state prior to receiving the download package.

12. The method of claim 11, wherein the appropriate recovery level is a partial recovery, and wherein the partial recovery maintains erase cycle counts or maintains a wear level of the one or more memory devices.

13. A storage device, comprising:
one or more memory devices;
one or more processors coupled to the one or more memory devices; and
a controller coupled to the one or more memory devices and the one or more processors, wherein the controller is configured to:
receive a trigger to enter an adaptive field recovery state;
confirm the storage device is in a state of error, wherein confirming the storage device is in a state of error comprises receiving a download package before a pre-determined time limit expires;
determine which error state the storage device is in while in the adaptive field recovery state; and
repair the error state of the storage device.

14. The storage device of claim 13, wherein repairing the error state comprises recovering data.

15. The storage device of claim 13, wherein repairing the error state comprises creating a metadata file.

16. The storage device of claim 13, wherein repairing the error state comprises downloading a download package.

17. The storage device of claim 16, wherein the download package comprises firmware and metadata.

18. The storage device of claim 13, wherein determining which error state the storage device is in comprises determining a partial recovery is required.

19. A storage device, comprising:
one or more memory devices; and
a controller coupled to the one or more memory devices, wherein the controller is configured to:
track error information as the storage device enters an error state;
receive a preparation signal to prepare the storage device for recovery;
receive a re-zeroing command to initiate the storage device to enter an adaptive field recovery state;
select an appropriate recovery level based on the tracked error information while in the adaptive field recovery state; and
download recovery firmware and metadata corresponding to the selected appropriate recovery level.

20. The storage device of claim 19, wherein the appropriate recovery level is a partial recovery.

21. The storage device of claim 20, wherein the partial recovery maintains erase cycle counts.

22. The storage device of claim 20, wherein the partial recovery maintains a wear level of the one or more memory devices.

23. The storage device of claim 20, wherein the one or more memory devices comprise a NAND memory device.

24. The storage device of claim 23, wherein NAND management of the NAND memory device remains functioning in the partial recovery.

25. The storage device of claim 19, wherein the appropriate recovery level is a full recovery.

26. The storage device of claim 25, wherein the full recovery resets the storage device to factory settings.

27. The storage device of claim 19, wherein the recovery firmware and metadata are comprised in a standard download package.

28. A storage device, comprising:
means for tracking failure information;
means for receiving a trigger to cause the storage device to enter an adaptive field recovery state, wherein the trigger is a re-zeroing command;
means for confirming the storage device is in a failure state;
means for selecting one or more recovery actions while in the adaptive field recovery state based on the tracked failure information; and
means for implementing the one or more recovery actions to recover the storage device from the failure state.

29. The storage device of claim 28, wherein the means for implementing the one or more recovery actions to recover the storage device from the failure state comprise downloading a recovery download package.

30. The storage device of claim 28, wherein the means for selecting one or more recovery actions is configured to determine a level of recovery required for the storage device.

* * * * *